United States Patent [19]

Thomas

[11] 4,115,027
[45] Sep. 19, 1978

[54] VERTICAL WINDMILL

[76] Inventor: Robert Nason Thomas, 80 Lincoln Dr., Ventura, Calif. 93003

[21] Appl. No.: 758,022

[22] Filed: Jan. 7, 1977

Related U.S. Application Data

[63] Continuation-in-part of Ser. No. 649,827, Jan. 16, 1976, abandoned.

[51] Int. Cl.² ............................................. F03D 7/06
[52] U.S. Cl. ....................................... 415/2; 126/247; 290/55; 415/183; 415/123
[58] Field of Search ............................ 415/2–5, 415/18, 123, 151, 159, 208, 183, 185, 216; 416/9–14, 119; 126/247; 122/26; 290/43, 44, 54, 55

[56] References Cited

U.S. PATENT DOCUMENTS

| 250,806 | 12/1881 | Hamel | 415/2 |
| 372,300 | 11/1887 | Chubbuck | 415/2 |
| 387,424 | 8/1888 | Koeppe | 415/4 |
| 544,922 | 8/1895 | Lundquist | 416/119 |
| 2,625,929 | 1/1953 | Love et al. | 126/247 |
| 4,012,163 | 3/1977 | Baumgartner | 415/2 |

FOREIGN PATENT DOCUMENTS

| 32,996 | 10/1922 | Denmark | 415/4 |
| 169,358 | 9/1921 | United Kingdom | 126/247 |

*Primary Examiner*—C. J. Husar
*Attorney, Agent, or Firm*—Lyon & Lyon

[57] ABSTRACT

An omnidirectional windmill employing lift type airfoils mounted about a vertical axis. The windmill includes a support frame which defines the vertically oriented axis about which the elongate airfoils rotate. Five vertically oriented stators are positioned outwardly of the airfoils about the windmill to form an omnidirectional diffuser. These stators extend radially from the vertical axis to substantially enhance the efficiency of the windmill. The stators also make the windmill self-starting. A friction heater is also disclosed in association with the windmill.

8 Claims, 8 Drawing Figures

VERTICAL WINDMILL

The present application is a continuation-in-part of U.S. patent application Ser. No. 649,827, filed Jan. 16, 1976, and now abandoned.

BACKGROUND OF THE INVENTION

This invention relates to lift type, vertical axis windmills. More specifically, the present invention is directed to a lift type, vertical axis windmill having an omnidirectional diffuser. A friction heater is also included.

Vertical axis windmills employing aerodynamic lift rather than differential drag have come to be of some interest as a means for employing wind energy to do work. Such vertical windmills are quite efficient and are able to derive power from the wind regardless of the wind direction. In theory, the upper limit of performance of differential drag windmills, or panemones, is 13 percent of the available kinetic energy in the wind. The theoretical upper limit for blade type windmills deriving performance from aerodynamic lift is 59.3 percent. Thus, the aerodynamic lift type windmills are far more efficient.

With the less efficient differential drag type windmills mounted about vertical axes, fixed baffles have been employed. These baffles are able to enhance somewhat the low performance of such windmills. In operation, the baffles act merely as wind blocking mechanisms or louvers to further reduce the drag on the low drag side of the windmill. Furthermore, the baffles are unidirectional and require that they be rotatably mounted with a trailing vane mechanism for positioning relative to the wind direction.

In spite of the advantages in efficiency of the lift type windmill over the differential drag type windmill, certain disadvantages also exist. For one, substantial blade speed is required before power may be derived from the wind. One such comparatively efficient aerodynamic lift type, vertical axis windmill must be rotated to a ratio of blade speed to wind speed of about 2.5 before net production of power can be maintained. Furthermore, the efficiency of such windmills has only been around 35 percent in spite of the theoretical maximum of 59.3 percent. Thus, both the differential drag mechanisms and the aerodynamic lift mechanisms heretofor employed have had operational disadvantages which have inhibited their use in many applications.

In employing such vertical axis windmills for other than straight mechanical work, such as pumping, it has been common to use the rotational energy developed by first generating electricity. The generated electrical power may then be used for a variety of purposes. A particularly desirable application in cold climates is to provide heat for homes and shelters. While it is possible to operate electrical heaters from electrical energy provided by windmills, the process is extremely inefficient, primarily because of the losses during energy conversion. However, the generation of electrical power makes it relatively easy to control the speed of rotation of the windmill as well as the power load on the windmill. Thus, the advantages of such a power conversion system are to be weighed against the disadvantages of mechanism complexity and loss of efficiency.

SUMMARY OF THE INVENTION

The present invention is directed to a vertical axis, lift type windmill having an omnidirectional diffuser. The nature of the windmill allows realization of the advantages of high efficiency and omnidirectional power generation. The omnidirectional diffuser further increases the efficiency of the windmill and overcomes the major deficiency of such windmills, i.e., lack of self-starting capability without having to employ blade articulation or other complex mechanical system. A frictional heater is also provided for highly efficient use of wind generated power.

The windmill employs vertically oriented airfoils which are designed to provide aerodynamic lift when experiencing relative motion to a body of air. The airfoils are capable of providing power to a central shaft when experiencing wind from any direction of the compass. As discussed above, the efficiency of these airfoils is much greater than that of differential drag type mechanisms.

Outwardly of the airfoils, an omnidirectional diffuser is provided which employs vertically standing elongate stators that each have an aerodynamic elongate cross-section with the major dimension thereof extending radially from the driven shaft of the windmill. The diffusers provide two critical functions to the operation of the windmill. First, the diffuser makes the windmill self-starting. Second, the diffuser increases the efficiency of the aerodynamic lift type, vertical axis windmill by around 30 percent.

Five stators are provided about the airfoils to define the omnidirectional diffuser. Five or more such stators have been found to create a self-starting capability for the aerodynamic lift type, vertical axis windmill. This self-starting capability is an extremely important advance over prior vertical axis windmills because outside power is not required to start the mechanism. Thus, hand cranking, electric motors and the like are not needed. This advantage is magnified when the present invention is employed in a remote area without electrical power.

Because of the symmetrical nature of the omnidirectional diffuser, the self-starting capability is provided regardless of the direction of the wind. It is understood that the diffuser directs a main portion of the passing air into a useful zone where the airfoils are most productive. By doing so, the diffuser shields non-productive and antiproductive zones which would otherwise rob necessary starting power from the windmill. Regardless of the wind direction, less than 50 percent of the airfoil path is directly exposed to the oncoming wind; this area being the area of maximum power production.

The omnidirectional diffuser also provides a substantial increase in efficiency. Vertical axis windmills employing aerodynamic lift have been measured at an efficiency capable of converting 35 percent of the available kinetic energy in the wind to useful power. With the omnidirectional diffuser, an efficiency of 45 percent has been obtained. This 30 percent increase in efficiency is derived from an increase in the amount of wind which is passed through an area of the airfoil path where maximum benefit is obtained for any given wind direction.

Optimum performance of a vertical axis windmill occurs where mass flow and momentum reduction of air through the airfoils is balanced to produce optimum power. If a greater amount of energy is extracted from the windmill than this optimum, mass flow is reduced as well as overall performance. By increasing the mass flow through use of the omnidirectional diffuser of the present invention, a greater amount of power may be extracted before momentum reduction causes mass flow to fall below optimum.

The conversion of the foregoing developed energy into heat in accordance with a preferred application of this invention is accomplished by coupling a friction heater directly to the rotating shaft of the windmill. The heat generated is thus maximized because a first conversion to electrical energy is avoided. Furthermore, the heater of the present invention is confined to provide low loads at low windmill speeds and higher loads with increased speeds.

Accordingly, it is an object of the present invention to provide an improved aerodynamic lift type, vertical axis windmill.

It is another object of the present invention to provide a windmill of high efficiency.

It is a further object of the present invention to provide a self-starting, aerodynamic lift type, vertical axis windmill.

Yet another object of the present invention is to provide an improved wind powered heater.

Other and further objects and advantages will appear hereinafter.

DETAILED DESCRIPTION OF THE PREFERRED EMBODIMENT

Figure 1:
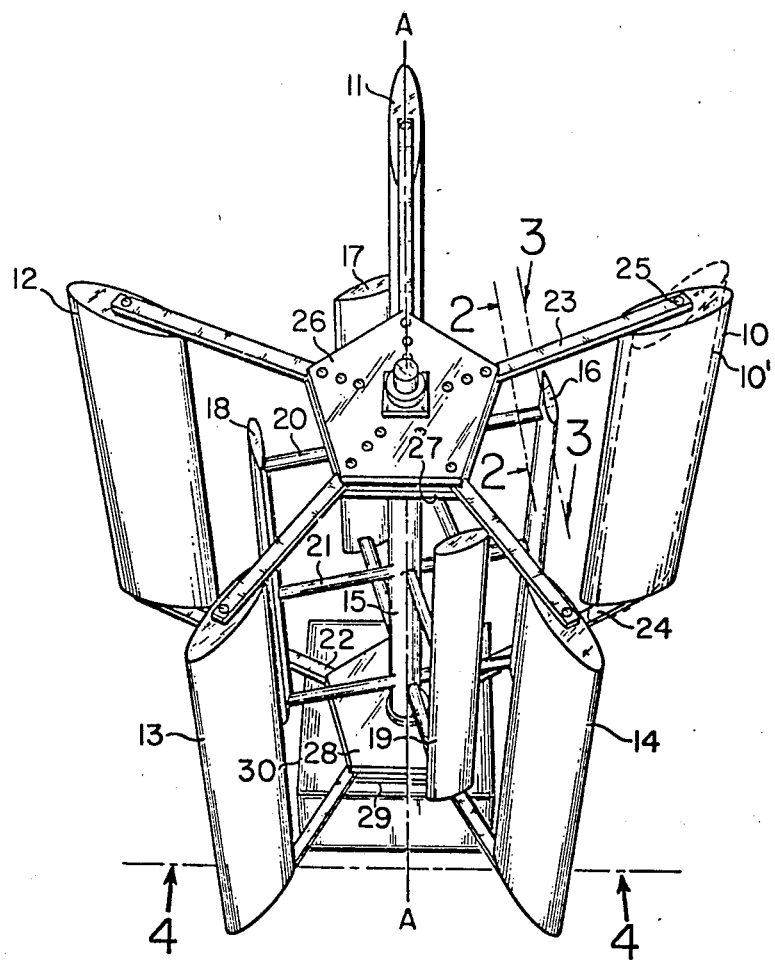
FIG. 1 is a prospective view of a vertical windmill of the present invention.

Turning now to the drawings and particularly FIG. 1, a windmill according to the present invention is disclosed. The windmill includes an omnidirectional diffuser defined by a plurality of vertically standing stators 10, 11, 12, 13 and 14. The stators 10 through 14 are equally spaced circumferentially about a fixed vertical axis A—A at a uniform radial distance from the axis. Five such stators 10-14 are illustrated in the present embodiment. As discussed above, a minimum of five stators provides the necessary diffuser configuration for self-starting. It is believed that a greater number of stators may be provided without affecting the self-starting capability of the windmill of the present invention. However, when more than five stators are employed, wind blockage might occur which would reduce the efficiency of the unit. Fewer than five stators may adversely affect the self-starting capability of the present invention. It is anticipated that some directional preference would be experienced in this regard.

Each of the five stators 10 through 14 are designed to provide a minimum of flow disturbance. Consequently, each stator is rounded at either end forming a cross-section which is broadly an elongate oval. The major dimension of the elongate cross-section of each stator extends substantially radially from the center axis A—A. If desired, the stators 10 through 14 may be pivotally mounted with locking mechanisms such that under prevailing wind conditions, the stators might be positioned to optimize flow to the windmill.

At the central axis A—A of the windmill, a central shaft is rotatably mounted. This shaft 15 forms a hub for a plurality of airfoils 16, 17, 18 and 19. The airfoils 16 through 19 have a cross-section designed to provide aerodynamic lift when experiencing relative motion to a body of air, namely wind. Airfoil design is well known in the art and in the illustrated embodiment a tear-drop shaped cross-section is employed. The cord of each airfoil 16 through 19 is generally tangential to the path of travel of each airfoil about the central axis A—A. This orientation of the airfoil may be varied according to conventional airfoil design to provide different angles of attack where advantageous. The four airfoils are preferably equally spaced circumferentially about the shaft 15 and are inwardly of the omnidirectional diffuser at a fixed radial distance from the shaft.

Figure 2:
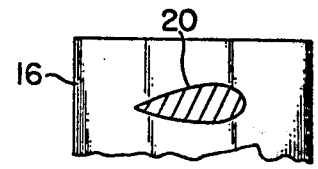
FIG. 2 is a fragmentary cross-section taken in the direction of the arrows 2—2 of FIG. 1.

To physically attach the airfoils 16 through 19 to the central shaft 15, struts 20, 21 and 22 are provided. Four such sets are employed, one set with each of the four airfoils. Naturally, minimum drag is a major consideration in strut design. The cross-section of each strut is also designed to provide aerodynamic lift as can be seen in FIG. 2. Such lift would result when vertical components of the wind are experienced within the windmill.

To support the rotatably mounted shaft 15 and the vertically standing stators 10 through 14, a support frame is provided. In the present embodiment, the support frame includes upper and lower support bars 23 and 24 which extend radially to the vertically standing stators 10 through 14. A lockable pivot may be provided at the connection points of these support bars 23 and 24 to the top and bottom ends of the stators 10 through 14 so that the stators can be pivotally adjusted as mentioned above. Inwardly of the upper support bars 23 is a bearing housing assembly including upper bearing plates 26 and 27 between which the support bars 23 are pinned. The bearing plates 26 and 27 rotatably support the central shaft 15 such that it may freely rotate therein. A similar arrangement is provided at the lower end of the support structure where support bars 24 extend inwardly to lower bearing plates 28 and 29. Again, the support bars 24 are pinned between the plates. The central shaft 15 is also rotatably mounted in the lower bearing plates 28 and 29 as can best be seen in FIG. 4. The lower bearing plates 28 and 29 are fixed to a stationary support, which in this instance comprises a housing 30.

Referring to the cross-section of FIG. 2, it will be noted that the strut such as the strut 20 is of teardrop shape in cross-section oriented in the direction of rotation of the shafts such that further rotational energy is imparted by vertical components of wind acting on the struts.

Figure 3:
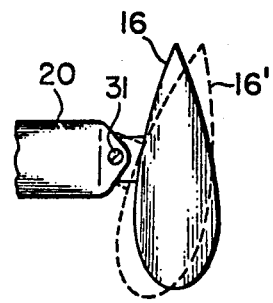
FIG. 3 is another fragmentary cross-section taken in the direction of the arrows 3—3 of FIG. 1.

FIG. 3 shows a detail of the securement of one of these struts, such as the strut 20, to the moveable airfoil 16. As shown, there is provided a bolt 31 functioning as a pivot so that the cord of the airfoil 16 fan be adjusted to an angle with respect to the tangent extending generally in the direction of rotation of movement of the airfoil.

Figure 4:
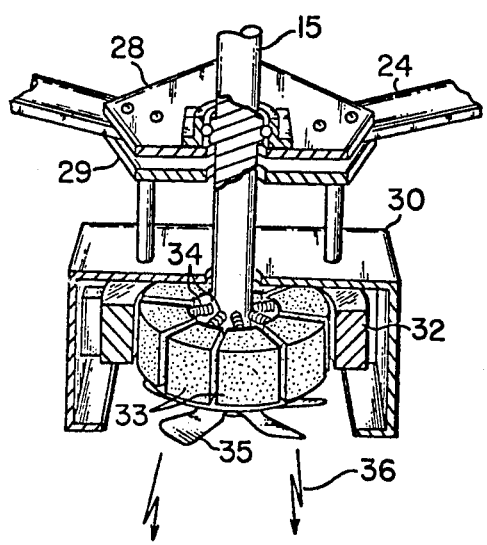
FIG. 4 is a fragmentary broken away prospective view looking generally in the direction of the arrows 4—4 of FIG. 1.

Referring now to FIG. 4, a lower housing 30 is shown broken away and it will be noted that the lower end of the central shaft 15 passes into the housing 30. A cylindrical brake drum 32 is shown secured within the housing and coaxially surrounding the lower end of the shaft 15. A plurality of brake shoes 33, in turn, are coupled to the shaft for rotation therewith in a manner such that their outer ends frictionally engage the inner cylindrical wall of the drum 32. By this arrangement, friction heat is developed when the shaft 15 is rotated. The brake shoe structure of the present invention includes spring means indicated at 34 extending between each brake shoe and the shaft. These spring means bias the brake shoes radially inwardly. Rotation of the shaft, on the other hand, causes the shoes to move radially outwardly against the bias of the springs as a result of centrifical force. This outward movement causes frictional engatement with the drum with greater friction being developed at higher rotational speeds of the windmill. By appropriately adjusting the spring tension as well as the mass of the shoes, optimum energy transfer from the rotating shaft into frictional heat can be realized. Such an optimum would have little or no frictional engagement at low starting speeds and maximum frictional contact at the speed of peak efficiency of the windmill.

In FIG. 4, a fan 35 is illustrated attached to the lower end of the shaft 15. This fan serves to blow a stream of air generally downwardly thereby aiding the spreading of generated heat. This heat spreading is indicated by the jagged arrows 36.

The combination windmill with heat generating means described is ideally suited for heating a room in a home or other shelter. The conversion of rotational energy into heat is almost 100 percent efficient. As the wind increases, the windmill will tend to rotate more rapidly which, in turn, increases the centifical force on the brake shoes against the inner brake lining of the brake drum. This action increases the friction to stabilize the rotational speed of the windmill and increase the output of heat. Therefore, in inclement weather with high winds, heating is increased.

In an actual embodiment the stators 10 through 14 might be 200 cm in height and fit within an outer circle of diameter of about 180 cm. The length of the cord of each of the stators might be, for example 25 cm. The diameter of the circular path of the inner airfoil is 120 cm while the cord length of these airfoils is 12 cm. The cord of each strut 20 through 22 can be about 5 cm. The foregoing dimensions are merely given as one example and may be changed for greater output or varying expected wind conditions.

Thus, a highly efficient and self-starting windmill is described. A combination of this windmill and an associated heater is also shown. While embodiments and applications of this invention have been shown and described, it would be apparent to those skilled in the art that many more modifications are possible without departing from the inventive concepts herein described. The invention, therefore, is not to be restricted except by the spirit of the appended claims.

What is claimed is:

1. A windmill for producing power in a moving body of air, comprising
    a support frame;
    a shaft rotatably mounted to said support frame about a vertical axis;
    a plurality of elongate airfoils mounted to said shaft and each having a cross-section designed to provide aerodynamic lift when experiencing relative motion to a body of air; and
    a plurality of elongate stators mounted to said support frames and standing vertically, outwardly from said airfoils, each said elongate stator being spaced circumferentially about said vertical axis and each said elongate stator having an elongate cross-section with the major dimension of said elongate cross-section extending substantially radially from said vertical axis.

2. The windmill of claim 1 wherein said airfoils extend substantially vertically at a second radial distance from said shaft and are spaced circumferentially about said vertical axis.

3. The windmill of claim 1 wherein said plurality of elongate stators inclue at least five said stators.

4. The windmill of claim 1 wherein said plurality of elongate stators includes exactly five said stators.

5. The windmill of claim 1 further including struts extending from said shaft to said plurality of elongate airfoils, said struts having a cross-section providing aerodynamic lift, said cross-section being oriented in a direction of rotation of said shaft such that further rotational energy is imparted by vertical components of wind acting on said struts.

6. The windmill of claim 1 wherein each of said plurality of elongate stators is pivotally adjustable about a vertical axis therethrough.

7. The windmill of claim 1 further including a lower housing receiving the lower end of said shaft, a cylindrical brake drum mounted in said housing and coaxially surrounding a portion of said shaft, brake shoes coupled to said shaft for rotation therewith within said cylindrical brake drum and spring means biased to hold said brake shoes away from said cylindrical brake drum when at rest.

8. The windmill of claim 1 wherein said plurality of airfoils is exactly four said airfoils.

* * * * *